UNITED STATES PATENT OFFICE.

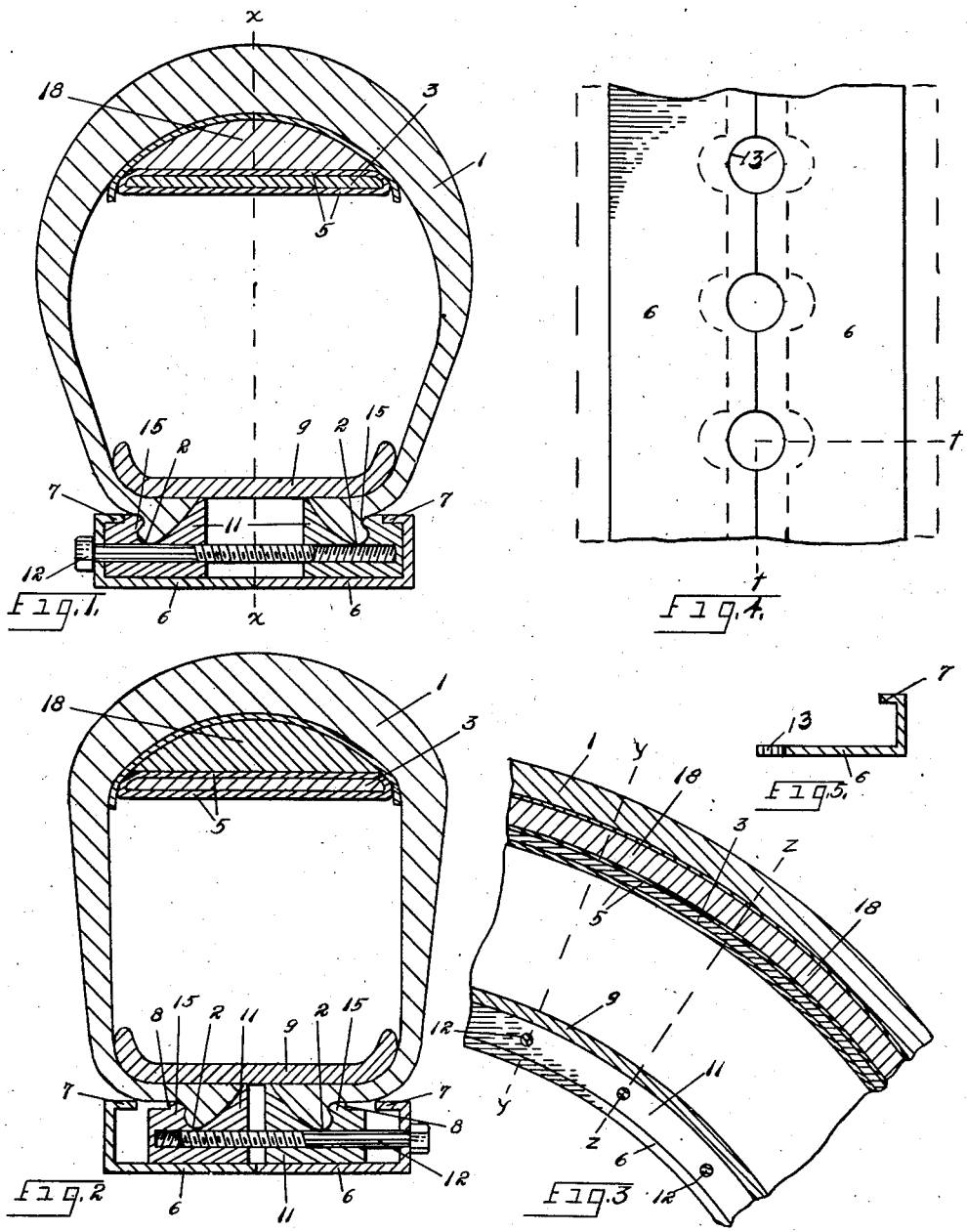

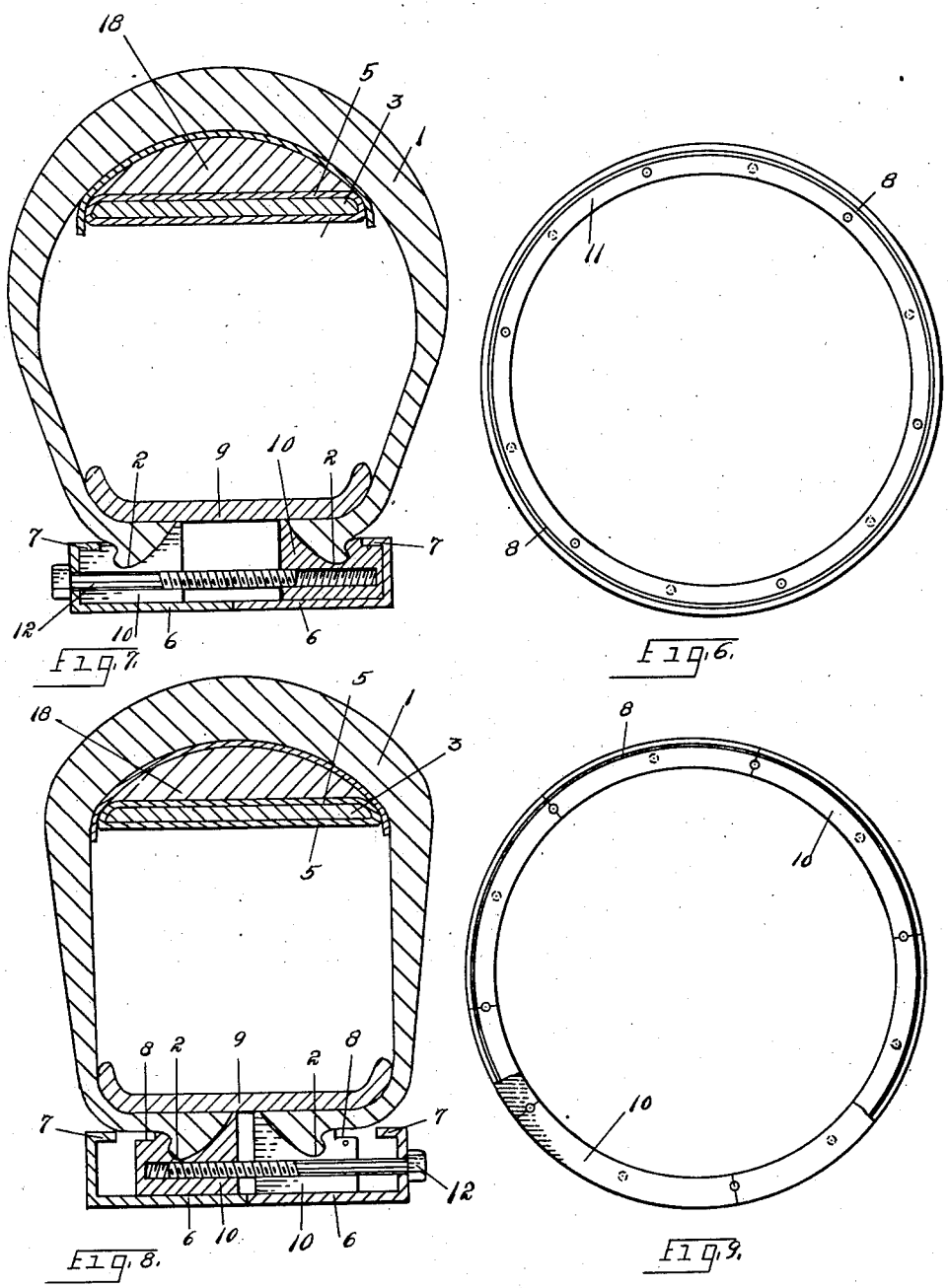

JOHN T. CLARK, OF PROVO, UTAH.

VEHICLE-TIRE.

1,074,246.　　　　　　Specification of Letters Patent.　　Patented Sept. 30, 1913.

Application filed November 29, 1912. Serial No. 734,203.

*To all whom it may concern:*

Be it known that I, JOHN T CLARK, a citizen of the United States, residing at Provo city, in the county of Utah and State of Utah, have invented certain new and useful Improvements in Vehicle-Tires, of which the following is a specification.

My invention relates to vehicle tires and has for its object to provide a resilient vehicle tire in which a spring effect is given to a wheel without the pneumatic principle being used, and to provide a vehicle tire which may be used on a majority of automobile wheels now constructed with but slight changes in the casing tension means whereby resiliency is secured in the tire by mechanical means.

The invention consists of the novel construction and combination of parts hereinafter described and illustrated in the accompanying drawings forming a part of this application in which drawings similar letters of reference indicate like parts throughout the several figures, it being understood that slight change in the manner of tensioning the casing member may be resorted to within the scope of the claims without departing from the spirit of the invention or sacrificing any of its principles.

In the drawings, Figure 1 is a radial cross section on line $y\ y$ of Fig. 3 with the casing but slightly tensioned. Fig. 2 is a radial cross section on line $z\ z$ of Fig. 3 with the outer casing tensioned. Fig. 3 is a fragmentary view of the tire in section on line $x\ x$ of Fig. 1. Fig. 4 is a fragmentary view in elevation of the guide cases looking outward from the axis also shown in dotted lines when not drawn together. Fig. 5 is a section of one of the same on line $t\ t$ of Fig. 4. Fig. 6 is a side elevation of one of the annular gripping bands. Fig. 7 is a radial cross section similar to Fig. 1 showing a modified form of construction used in the annular gripping bands. Fig. 8 is a radial cross section similar to Fig. 2 showing a modified form of the annular gripping bands. Fig. 9 is a side elevation of the annular gripping bands showing the modified form of construction portions of one of said bands cut away.

It is my purpose to use an outer casing 1 similar to that now used on automobiles and other vehicles. On each edge of said casing is integrally formed a clamping lug 2. Within said casing 1, and adjacent its inner annular periphery is concentrically placed a guard band 18 made of leather or other flexible material. Concentrically within and adjacent the inner periphery of said guard band is placed the endless spring band 3. The edges of said band are rounded to prevent injury to said guard band 18, and said spring band 3 is covered with rubberized flexible material 5. Within said spring band 3, and concentrically spaced therefrom is an inner floating band 9 having each edge thereof flanged outwardly. The purpose of said flanges is to support the sides of said casing 1 on the inside against lateral movement when the wheels tend to skid as in turning a street corner rapidly; also to aid the said spring band 3 when subjected to sudden strain or extra pressure. Two annular gripping bands 11 are provided within said floating band 9, and adjacent thereto. Each of said gripping bands 11 has a flange 15 thereon to engage said clamping lug 2 on the casing 1. Said gripping bands 11 are each inclosed within an annular guide case 6, which has holes provided in the vertical portion thereof and each has an inwardly extended flange 7 on the outer periphery thereof to engage in a shoulder 8, which is cut in said gripping band 11, adjacent. Said holes provided in said guide cases are in line with holes provided in said gripping bands 11, and said guide cases and gripping bands are held in place, and said gripping bands in contact with said casing 1 by the threaded tap bolts 12. Said holes are provided and said bolts are inserted from alternate sides in order that the stress of said bolts will be distributed evenly, and when said bolts are turned within the threaded tapped openings in said gripping bands 11, said gripping bands 11 will be drawn toward each other, and thereby the said casing 1 will be tensioned over said bands 3 and 9.

Where the pneumatic principle is used the tension on the outer tire is determined and regulated by the inflation of the inner tube and the pressure is outward. In my tire the tension of the outer casing 1 is determined and regulated by bolts 12 and the pressure is radially inward on the band 3 and radially outward on the band 9. The extreme tension that may be given to the outer casing 1 is determined by the strength of the material in said casing and the inward or crushing strength of the band 3 and the outward or tensile strength of the band 9. The resiliency of my tire is determined by the tensile stress on the outer casing 1.

A modified form of constructing the gripping bands is shown in Figs 7, 8 and 9, wherein the said bands are made up of segments 10. Said segments are placed in said guide cases 6 and securely held therein by said bolts 12 being inserted through the holes in the vertical portions of said guide cases and through the openings in the contiguous ends of two of said segments and screwed into the alined hole of a segment of the other of said bands. In the modified form the said bands when the segments are in place, form gripping bands similar in form and used in the same place as said gripping bands 11. Said segments of one band are placed in staggered relation circumferentially to the segments comprising the other band. Each of said segments 10 has the shoulder 8 similar to that when said gripping bands are made in one piece, and the cutting of said gripping bands into segments is to prevent undue strain on one of said bolts 12, or on one portion of said gripping bands 11. The openings 13, which are cut in the inner periphery of said guide cases 6 are to enable the workman to see the position of the gripping bands 11 to guide him in securing an even tension on every portion of said outer casing 1 when tightening the bolts 12.

Having thus described my invention I desire to secure by Letters Patent and claim:—

1. A vehicle tire consisting of two floating concentric bands; a flexible tubular casing having a bead near each edge thereof and inclosing said bands and tending to draw the outer of said bands radially inward and the inner of said bands radially outward; a guide case consisting of two opposed annular metal members L-shaped in cross section; opposed laterally-movable annular bands adapted to engage said beads, each having threaded and unthreaded openings transversely therethrough; threaded bolts each adapted to engage one of said L-shaped metal members with the head of the bolt and the annular band in the other L-shaped member by means of the threads to move said last mentioned annular band laterally in said guide case to tension said tubular casing transversely and to hold said guide case, annular bands, floating bands, and tubular casing in fixed relation with each other.

2. A vehicle tire consisting of two floating bands of different diameters; a flexible tubular casing having a bead near each edge and inclosing said bands to hold them concentric; an annular guide case concentrically within said tubular casing and consisting of two opposed members L-shaped in cross section; opposed annular bands adapted to engage said beads and operable in said guide case; and means to move said annular bands within said guide case and thereby to tension said casing transversely of the wheel and hold said guide case, annular bands and floating bands in fixed relation with each other.

In testimony whereof I have affixed my signature in presence of two witnesses.

JOHN T. CLARK.

Witnesses:
SAM RANEY,
W. R. WILLIAMS.